(12) United States Patent
Takata

(10) Patent No.: US 10,102,840 B2
(45) Date of Patent: Oct. 16, 2018

(54) SOUND ABSORBER AND WIRING HARNESS WITH SOUND ABSORBER

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yutaka Takata, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi, Osaka (JP)

(*) Notice: Subject to any disclaimer, the term of this patent is extended or adjusted under 35 U.S.C. 154(b) by 130 days.

(21) Appl. No.: 15/115,949

(22) PCT Filed: Jan. 29, 2015

(86) PCT No.: PCT/JP2015/052422
§ 371 (c)(1),
(2) Date: Aug. 2, 2016

(87) PCT Pub. No.: WO2015/125575
PCT Pub. Date: Aug. 27, 2015

(65) Prior Publication Data
US 2017/0169809 A1    Jun. 15, 2017

(30) Foreign Application Priority Data
Feb. 19, 2014    (JP) .................................. 2014-029341

(51) Int. Cl.
*B60R 16/02*    (2006.01)
*B60R 13/08*    (2006.01)
(Continued)

(52) U.S. Cl.
CPC ............ *G10K 11/162* (2013.01); *B60R 13/08* (2013.01); *B60R 16/0207* (2013.01)

(58) Field of Classification Search
CPC .... G10K 11/16; G10K 11/162; D04H 1/4382; B60R 13/08; B60R 13/0846;
(Continued)

(56) References Cited

U.S. PATENT DOCUMENTS 5,677,027 A * 10/1997 Masuda .................. B32B 27/02
                                                           428/96
RE36,323 E * 10/1999 Thompson ................ B32B 5/02
                                                           181/286
(Continued)

FOREIGN PATENT DOCUMENTS

JP    2003-216161    7/2003
JP    3166607    2/2011

OTHER PUBLICATIONS

International Search Report.

*Primary Examiner* — Edgardo San Martin
(74) *Attorney, Agent, or Firm* — Gerald E. Hespos; Michael J. Porco; Matthew T. Hespos

(57) ABSTRACT

If a thickness of a sound absorber arranged in a vehicle and clearances in the vehicle do not match and gaps are formed between the sound absorber and the respective members in the vehicle, abnormal noise due to the mutual contact of the members and noise outside the vehicle enter the vehicle interior to impair vehicle interior quietness. This is solved by a sound absorber which includes a nonwoven fabric containing 5 to 50 mass % of second fibers having a lower melting point than that of first fibers and can cause the first and second fibers to be more loosely interfaced and increase a volume of the nonwoven fabric by heating the nonwoven (Continued)

fabric to about the melting point of the second fibers and softening or melting the second fibers even after production.

12 Claims, 8 Drawing Sheets

(51) Int. Cl.
*G10K 11/162* (2006.01)
*B60R 16/00* (2006.01)

(58) Field of Classification Search
CPC . B60R 16/02; B60R 16/0207; B60R 16/0215; H02G 3/04; H02G 3/0412; B32B 5/12; B32B 5/26; B32B 5/022; B32B 2250/20
See application file for complete search history.

(56) References Cited

U.S. PATENT DOCUMENTS

| | | | | |
|---|---|---|---|---|
| 7,641,962 B2 * | 1/2010 | Sutton | ................... | D04H 1/44 156/148 |
| 7,677,356 B2 * | 3/2010 | Yang | ................... | D04H 1/435 181/167 |
| 8,387,747 B2 * | 3/2013 | Koike | ................... | B32B 3/12 181/284 |
| 8,497,426 B2 * | 7/2013 | Sato | ................... | B60R 16/02 174/68.1 |
| 9,362,726 B2 * | 6/2016 | Takata | ................... | H01B 7/292 |
| 9,505,359 B2 * | 11/2016 | Takata | ................... | B32B 5/022 |
| 9,570,061 B2 * | 2/2017 | Takata | ................... | B32B 5/26 |
| 2008/0067002 A1 * | 3/2008 | Pfaffelhuber | ......... | B60R 13/083 181/290 |
| 2015/0203058 A1 * | 7/2015 | Osada | ................ | B60R 13/0243 307/9.1 |
| 2015/0235734 A1 * | 8/2015 | Takata | ................ | H01B 7/0045 442/389 |
| 2015/0310968 A1 * | 10/2015 | Murata | ............ | H01B 13/01254 264/272.15 |
| 2016/0329039 A1 * | 11/2016 | Takata | ................ | B60R 13/0846 |
| 2017/0309266 A1 * | 10/2017 | Akasaka | ............. | G10K 11/162 |

* cited by examiner

SOUND ABSORBER AND WIRING HARNESS WITH SOUND ABSORBER

BACKGROUND

1. Field of the Invention

The present invention relates to a sound absorber using a nonwoven fabric and a wiring harness with sound absorber in which a sound absorber and a wiring harness are integrated.

2. Description of the Related Art

Conventionally, sound insulators and sound absorbers made of glass wool, rock wool, porous ceramic, waste cotton and the like have been provided near devices, which generate noise, in a vehicle for the purpose of enhancing the vehicle interior quietness of an automotive vehicle. However, nonwoven fabrics are used in many of these sound insulators and sound absorbers at present from the perspective of the workability of sound insulators and sound absorbers, influences on human bodies, recyclability, environmental loads and weight reduction.

Further, there have been rapid growths in performances and functions centering on automotive vehicles, electronic products and the like in recent years. For the precise operation of various electronic facilities such as these automotive vehicles and electronic products, it is necessary to use a plurality of wires for internal wiring. These plurality of wires are generally used in the form of a wiring harness. The wiring harness is formed by assembling a plurality of wires into a form necessary for wiring in advance and covering the outer periphery of a wire bundle with a wiring harness protective material having one of various shapes such as a tape shape, a tube shape and a sheet shape after performing necessary branching, the mounting of connectors on ends and the like.

A wiring harness mounted in an automotive vehicle is arranged in the vehicle to electrically connect various electric components including devices which generate noise as described above. This wiring harness may generate noise by contacting a vehicle body or another member or the like in the vehicle such as due to vibration. Thus, a cushioning material for suppressing noise due to contact with the other member or the like may be provided on the outer periphery of the wiring harness. An example of a known wiring harness is disclosed in Japanese Unexamined Patent Publication No. 2003-216161.

Generally, a basis weight, a thickness and the like, which are specifications, of a nonwoven fabric are determined and fixed in a production process of the nonwoven fabric. Thus, in the case of changing the basis weight, the thickness and the like of the nonwoven fabric after production, it requires man-hours due to reworking and causes a material loss.

On the other hand, if a thickness of a sound absorber and clearances in a vehicle do not match and gaps are formed between the sound absorber and the respective members in the vehicle when the sound absorber is arranged in the vehicle, abnormal noise due to the mutual contact of the members and noise outside the vehicle may enter the vehicle interior to impair vehicle interior quietness.

SUMMARY

To solve the above problem, a sound absorber according to the present invention is a sound absorber with a nonwoven fabric containing first fibers and second fibers having a lower melting point than that of the first fibers, wherein a mixing ratio of the second fibers in the nonwoven fabric is 5 to 50 mass %.

Since the nonwoven fabric of the sound absorber according to the present invention contains 5 to 50 mass % of the second fibers having the lower melting point than that of the first fibers, the nonwoven fabric can cause the first and second fibers to be more loosely interfaced and increase a volume of the nonwoven fabric due to resilient forces of the first fibers by heating the nonwoven fabric to about the melting point of the second fibers and softening or melting the second fibers even after production. That is, the sound absorber can be expanded. Thus, even if the thickness of the sound absorber arranged in the vehicle and clearances in the vehicle, for example, do not match and gaps are formed between the sound absorber and the respective members in the vehicle, the gaps can be filled up to enhance vehicle interior quietness by expanding the sound absorber by the above method.

Further, since the second fibers can be softened or melted at an environmental temperature in the vehicle by setting the melting point of the second fibers at 120° C. or lower, a step of expanding the sound absorber by heating in advance can be omitted.

Further, a fiber diameter of the second fibers is preferably 4 to 100 μm to combine sound absorption performance and durability as the sound absorber. This is because the sound absorption performance can be enhanced by reducing the fiber diameter, but the durability of the sound absorber is lost if the fibers are excessively thinned and, conversely, a sound absorption effect of the sound absorber is not exhibited if the fibers are excessively thickened.

By forming the first and second fibers of the same kind of thermoplastic resins, adhesion at the time of thermal fusion is excellent and the both fibers can be recycled without being separated. The same kind mentioned here means that similar fibers can be used even when they are not identical if thermal fusion and recycling are possible.

By integrating the sound absorber of the present invention with at least a part of the wiring harness, noise generated by the contact of the wiring harness with another member in the vehicle such as due to vibration generated during the travel of the vehicle can be effectively suppressed, and the sound absorber can function also as a protective material for the wiring harness. A method for winding or sandwiching the wiring harness with one or a plurality of sound absorbers is considered as a method for integrating the sound absorber(s) and the wiring harness.

According to a sound absorber and a wiring harness with sound absorber of the present invention, it is possible to, even if a thickness of the sound absorber arranged in a vehicle and clearances in the vehicle do not match and gaps are formed between the sound absorber and the respective members in the vehicle, prevent the entrance of abnormal noise due to the mutual contact of the members and noise outside the vehicle into the vehicle interior and enhance vehicle interior quietness.

DETAILED DESCRIPTION

Figure 1:
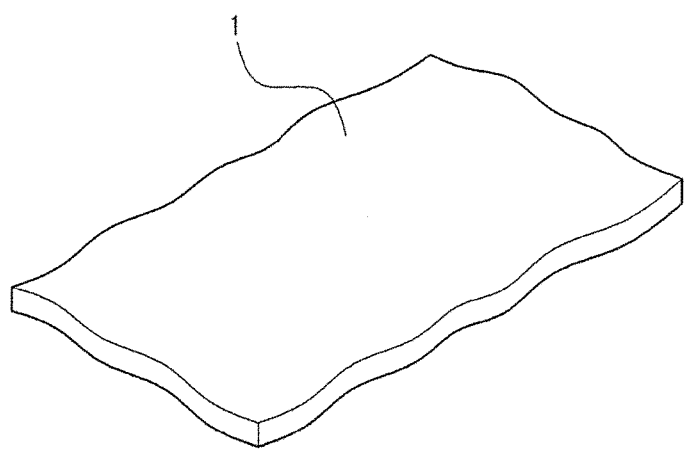
FIG. 1 is an external perspective view of a sound absorber according to the present invention.

Hereinafter, embodiments of the present invention are described in detail using the drawings. FIG. 1 is an external perspective view of a sound absorber 1 according to the present invention.

Although a basis weight and a thickness of the sound absorber 1 are not particularly limited, the basis weight is preferably set within a range of 50 to 400 g/m2 and the thickness is preferably set within a range of 5 to 20 mm according to the shapes of clearances in a vehicle and a frequency band of noise.

Needle punching, thermal bonding, chemical bonding and the like can be used as a production method of the sound absorber 1.

Polyesters such as polyethylene terephthalate and polybutylene terephthalate and thermoplastic resins such as polyolefin, nylon, polyamide, polyvinyl chloride, rayon, acrylonitrile and cellulose can be used as first and second fibers of the sound absorber 1. If necessary, a plurality of kinds of thermoplastic resins may be used.

Cross-sectional shapes of the above first and second fibers are not particularly limited and fibers of a core-sheath type, a cylindrical type, a hollow type and a side-by-side type and fibers having a modified cross-section different in shape from normal fibers may be used.

A mixing ratio of the second fibers to the first fibers of the sound absorber 1 is set to be within 5 to 50 mass %. This is because an expansion effect of the sound absorber by heating cannot be obtained if the mixing ratio of the second fibers is smaller than 5 mass % or larger than 50 mass %.

A melting point of the second fibers of the sound absorber 1 is preferably not higher than 120° C., which is a reachable environmental temperature in the vehicle, and more preferably not higher than 80° C. This is because the expansion effect of the sound absorber can be obtained also in places other than those where a high temperature is reached such as an engine compartment by setting the melting point of the second fibers at 80° C. or lower. Note that, needless to say, the melting point of the second fibers should be set higher than a room temperature so that expansion is not started before the sound absorber is mounted in the vehicle.

Fiber diameters of the first and second fibers are preferably within a range of 4 to 100 μm. This is to combine the sound absorption performance and the durability of the sound absorber 1.

Adhesion at the time of thermal fusion can be enhanced and the both fibers can be recycled without being separated by using the same kind of thermoplastic resins for the first and second fibers of the sound absorber 1.

The sound absorber 1 can be suitably used in a place where it is desired to shut off noise in an automotive vehicle such as the inside of a dashboard of the vehicle and between the engine compartment and the vehicle interior.

Figure 2:
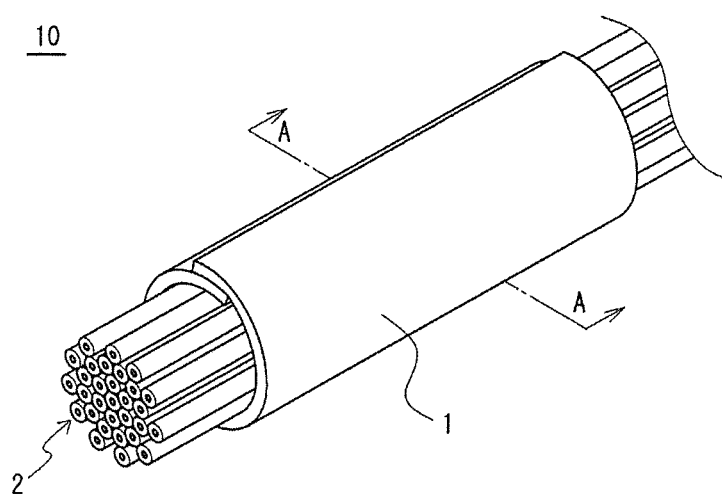
FIG. 2 are an external perspective view and a section of a wiring harness with sound absorber including one sound absorber.
Figure 2B:
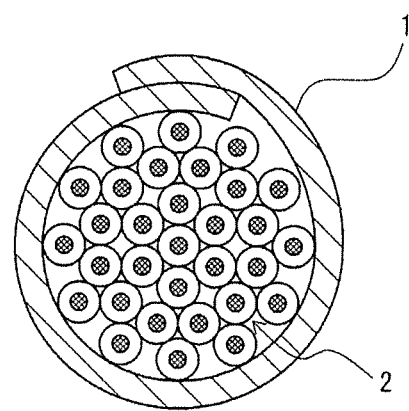

FIG. 2 are an external perspective view and a section of a wiring harness with sound absorber including one sound absorber, wherein FIG. 2(a) is the external perspective view of a wiring harness with sound absorber 10 and FIG. 1(b) is a section along A-A of FIG. 1(a).

The wiring harness with sound absorber 10 is formed by winding one sound absorber 1 around a wiring harness 2 composed of a wire bundle formed by bundling a plurality of wires each configured such that a core is covered around with an insulator. The wiring harness 2 is not limited to the wire bundle and may be composed of a single wire.

Further, since the sound absorber 1 and the wiring harness 2 are integrated, the wiring harness with sound absorber 10 can reduce noise generated by the contact of the wiring harness 2 with another member such as due to vibration generated during the travel of the vehicle and the sound absorber 1 functions also as a protective member for the wiring harness 2.

Further, by setting the melting point of the second fibers of the sound absorber 1 of the wiring harness with sound absorber 10 at the reachable environmental temperature in the vehicle or lower, the sound absorber 1 expands at the environmental temperature in the vehicle to fill up clearances between the wiring harness 2 and other members in the vehicle. By eliminating the clearance, the wiring harness 2 can be prevented from contacting a vehicle body, other members and the like such as due to vibration.

An example of a means for fixing and integrating the sound absorber 1 to and with the wiring harness 2 is a method for bonding the sound absorber 1 using an adhesive, a stapler or the like. Besides, the sound absorber 1 may be fixed using an unillustrated separate mounting member.

Figure 3A:
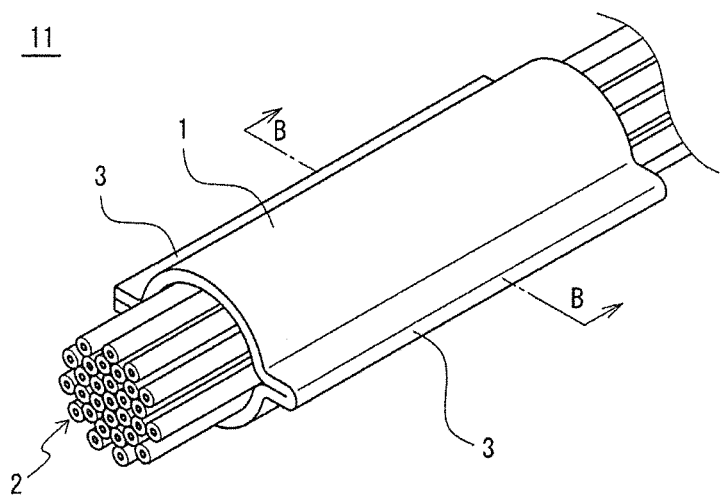
FIG. 3 are an external perspective view and a section of another form of a wiring harness with sound absorber including one sound absorber.
Figure 3B:
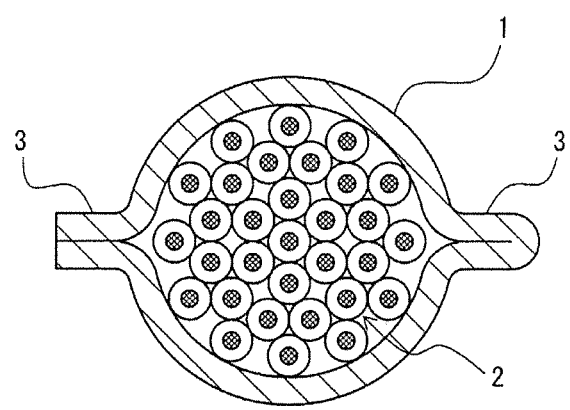

FIG. 3 are an external perspective view and a section of another embodiment of a wiring harness with sound absorber including one sound absorber, wherein FIG. 3(a) is the external perspective view of a wiring harness with sound absorber 11 and FIG. 3(b) is a section along B-B of FIG. 3(a).

The wiring harness with sound absorber 11 is the same as the wiring harness with sound absorber 10 in that one sound absorber 1 is wound on the outer periphery of a wiring harness 2, but the sound absorber 1 wound in the wiring harness with sound absorber 11 is formed with two ear portions 3 extending along an axial direction thereof and extending radially outward from circumferentially symmetrical positions. The ear portions 3 are formed by bonding circumferential surplus parts of the sound absorber 1 using an adhesive, a stapler or the like, one of the ear portions 3 is formed by bonding circumferential end parts of the sound absorber 1 and the other is formed by bending and bonding the surplus part at the position symmetrical with the one ear portion 3. By the expansion of the ear portions 3 after the arrangement of the wiring harness with sound absorber 11, larger clearances in the vehicle can be filled up.

Figure 4A:
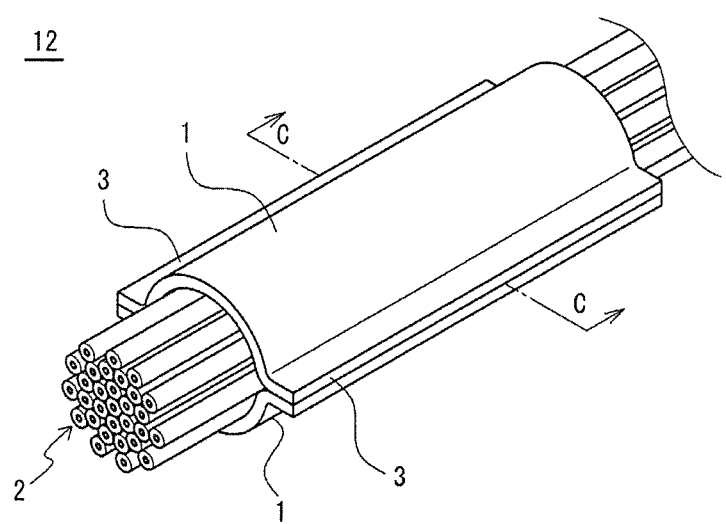
FIG. 4 are an external perspective view and a section of a wiring harness with sound absorber sandwiched by two sound absorbers.
Figure 4B:
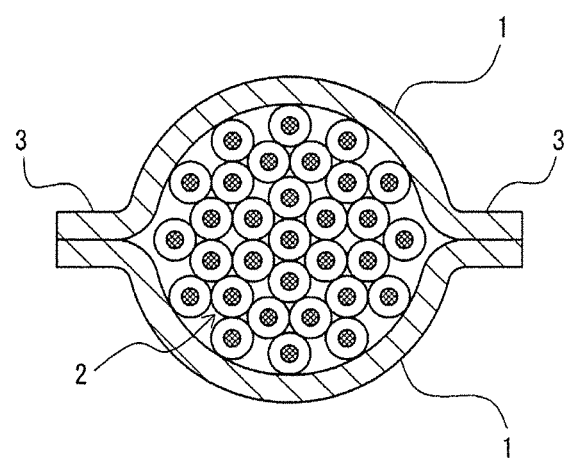

FIG. 4 are an external perspective view and a section of another embodiment of a wiring harness with sound absorber sandwiched between two sound absorbers, wherein FIG. 4(a) is the external perspective view of a wiring harness with sound absorber 12 and FIG. 4(b) is a section along C-C of FIG. 4(a).

The wiring harness with sound absorber 12 has the same configuration and effects as the wiring harness with sound absorber 11 except in that a sound absorber covering a wiring harness 2 is composed of two sound absorbers 1.

EXAMPLES

Examples and Comparative Examples of the sound absorber according to the present invention are described below. Two overlapping nonwoven fabrics adjusted to have a basis weight of 300 g/m² and a thickness of 10 mm and produced by needle punching were used as the sound absorber of each of these Examples and Comparative Examples. Further, polyester fibers (PET fibers) were used as the first fibers, low-melting-point polyester fibers (low-melting point PET fibers) were used as the second fibers, and fiber diameters were respectively 14 μm. A melting point of the PET fibers is 255° C. and that of the low-melting-point PET fibers is 110° C.

A mixing ratio of the low-melting-point PET fibers in the sound absorber of each of Examples and Comparative Examples were: 5 mass % of the low-melting-point PET fibers to 95 mass % of the PET fibers in Example 1, 20 mass % of the low-melting-point PET fibers to 80 mass % of the PET fibers in Example 2, 40 mass % of the low-melting-point PET fibers to 60 mass % of the PET fibers in Example 3, 50 mass % of the low-melting-point PET fibers to 50 mass % of the PET fibers in Example 4 and 60 mass % of the low-melting-point PET fibers to 40 mass % of the PET fibers in Comparative Example 1. Further, the sound absorber is composed of only PET fibers without containing any low-melting-point PET fibers in Comparative Example 2 while being composed of only low-melting-point PET fibers 100 without containing any PET fibers in Comparative Example 3.

[Thickness Change Due to High Temperature]

The sound absorbers of Examples 1 to 4 and Comparative Examples 1, 2 were put in a constant temperature bath and a heating treatment was performed at 100° C. for 24 hours in accordance with JIS C 0021 (C 60068-2-2) "Environment Test Method—Electrical/Electronical—High Temperature (Heat Resistance)—Test Method". Thereafter, those sound absorbers were taken out from the constant temperature bath and left to stand until being cooled to normal temperature. Then, thicknesses before and after the sound absorbers were put in the constant temperature bath were measured in accordance with JIS L 1913 "General Nonwoven Fabric Test Method". That result is shown in Table 1.

TABLE 1

| | Unit | Ex. 1 | Ex. 2 | Ex. 3 | Ex. 4 | C-Ex. 1 | C-Ex. 2 |
|---|---|---|---|---|---|---|---|
| PET fibers | mass % | 95 | 80 | 60 | 50 | 40 | 100 |
| Low-Melting Point PET Fibers | mass % | 5 | 20 | 40 | 50 | 60 | 0 |
| Thickness before heating treatment | mm | 10 | 10 | 10 | 10 | 10 | 10 |
| Thickness after heating treatment | mm | 14 | 14 | 13 | 12 | 8 | 10 |

As shown in the row "Thickness after heating treatment" of Table 1, the sound absorbers having a mixing ratio of the low-melting-point PET fibers of 5 to 50 mass % showed a tendency that the thickness was increased by the heating treatment (Examples 1 to 4), but a tendency that the thickness was conversely reduced by the heating treatment appeared when the mixing ratio became larger than 50 mass %. In Comparative Example 1 in which the mixing ratio of the low-melting-point PET fibers is 60 mass %, which is larger than 50 mass %, it is found that the thickness after the heating treatment is 8 mm and reduced by the heating treatment. Further, in Comparative Example 2 in which the mixing ratio of the low-melting-point PET fibers was 0 mass %, there was, of course, no thickness change even if the heating treatment was applied. However, the thickness of any of the sound absorbers whose mixing ratios were smaller than 5 mass % was not changed by the heating treatment.

Further, it is found from Table 1 that the mixing ratio of the low-melting-point PET fibers is more preferably about 5 to 20 mass %.

[Sound Absorption Performance Comparison]

A reverberant sound absorption coefficient was measured for each of the sound absorbers of Examples 1 to 4 and Comparative Examples 1, 2 and sound absorption performance was evaluated. A sound absorption coefficient measurement result is shown in Table 2. A specific test method for the reverberant sound absorption coefficient is as follows.

Figure 5:
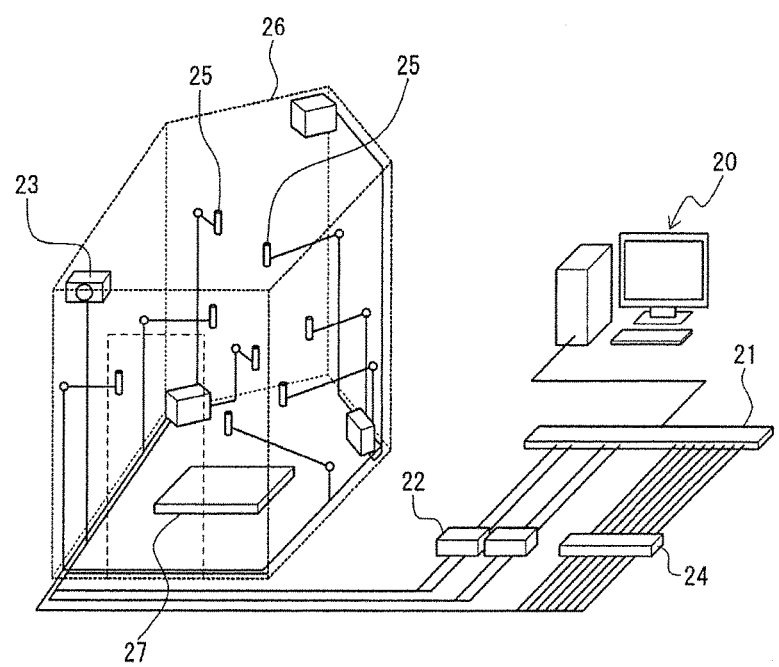
FIG. 5 is a diagram showing a method for measuring a reverberant sound absorption coefficient of the sound absorber.

The test was conducted in accordance with JIS A 1409 "Reverberant Sound Absorption Coefficient Measurement Method" and the sound absorption coefficient was obtained by a calculation equation (1) written below. The test was conducted using a reverberant chamber 26 in which a speaker 23 connected to a personal computer 20 through a power amplifier 22 via an audio interface 21 and microphones 25 connected to the personal computer 20 through a microphone amplifier 24 via the audio interface 21 are arranged at predetermined positions as shown in FIG. 5. First, in a state where a specimen 27 (each sound absorber of Examples 1 to 4 and Comparative Examples 1, 2) is not arranged in the reverberant chamber 26, electrical noise sound was radiated from the speaker 23 and stopped, and a sound attenuation process was measured by the microphones 25. Subsequently, a time during which sound was attenuated in a range of −5 to −35 dB was obtained as a reverberation time T1 from a measured attenuation curve. The measurement was conducted in every ⅓ octave band at a center frequency of 400 Hz to 5000 Hz. Subsequently, the specimen 27 was arranged on a floor surface of the reverberant chamber 26, a reverberation time T2 was obtained in a manner similar to the above and a sound absorption coefficient (αS) was calculated by the following equation (1). Note that the larger a value of the sound absorption coefficient, the more sound is absorbed.

$$\alpha s \text{ (sound absorption coefficient)} = A/S \quad (1)$$

S: area of specimen (m²)

A: equivalent sound absorption area (m²) obtained by the following equation (2).

$$A = 55.3 \, V/c \cdot [1/T_2 - 1/T_2] \quad (2)$$

V: volume of reverberant chamber with no specimen placed (m³)

c: sound velocity in air (m/s)

$T_1$: reverberation time of reverberant chamber with no specimen placed (s)

$T_2$: reverberation time of reverberant chamber with specimen placed (s)

TABLE 2

| Frequency (Hz) | Before HT | Ex. 1, 2 | Ex. 3 | Ex. 4 | C-Ex. 1 | C-Ex. 2 |
|---|---|---|---|---|---|---|
| | | Sound Absorption Coefficient | | | | |
| 400 | 0.18 | 0.28 | 0.20 | 0.19 | 0.10 | 0.18 |
| 500 | 0.20 | 0.35 | 0.28 | 0.24 | 0.17 | 0.20 |
| 630 | 0.28 | 0.48 | 0.35 | 0.31 | 0.18 | 0.28 |
| 800 | 0.35 | 0.58 | 0.48 | 0.41 | 0.20 | 0.35 |
| 1000 | 0.48 | 0.72 | 0.58 | 0.53 | 0.28 | 0.48 |
| 1250 | 0.58 | 0.88 | 0.72 | 0.65 | 0.35 | 0.58 |
| 1600 | 0.72 | 1.00 | 0.88 | 0.80 | 0.48 | 0.72 |
| 2000 | 0.88 | 1.05 | 1.00 | 0.94 | 0.58 | 0.88 |
| 2500 | 1.00 | 1.09 | 1.05 | 1.03 | 0.72 | 1.00 |
| 3150 | 1.05 | 1.09 | 1.09 | 1.07 | 0.88 | 1.05 |
| 4000 | 1.09 | 1.06 | 1.09 | 1.09 | 1.00 | 1.09 |
| 5000 | 1.09 | 1.02 | 1.06 | 1.08 | 1.05 | 1.09 |

* HT: heating treatment

Figure 6:
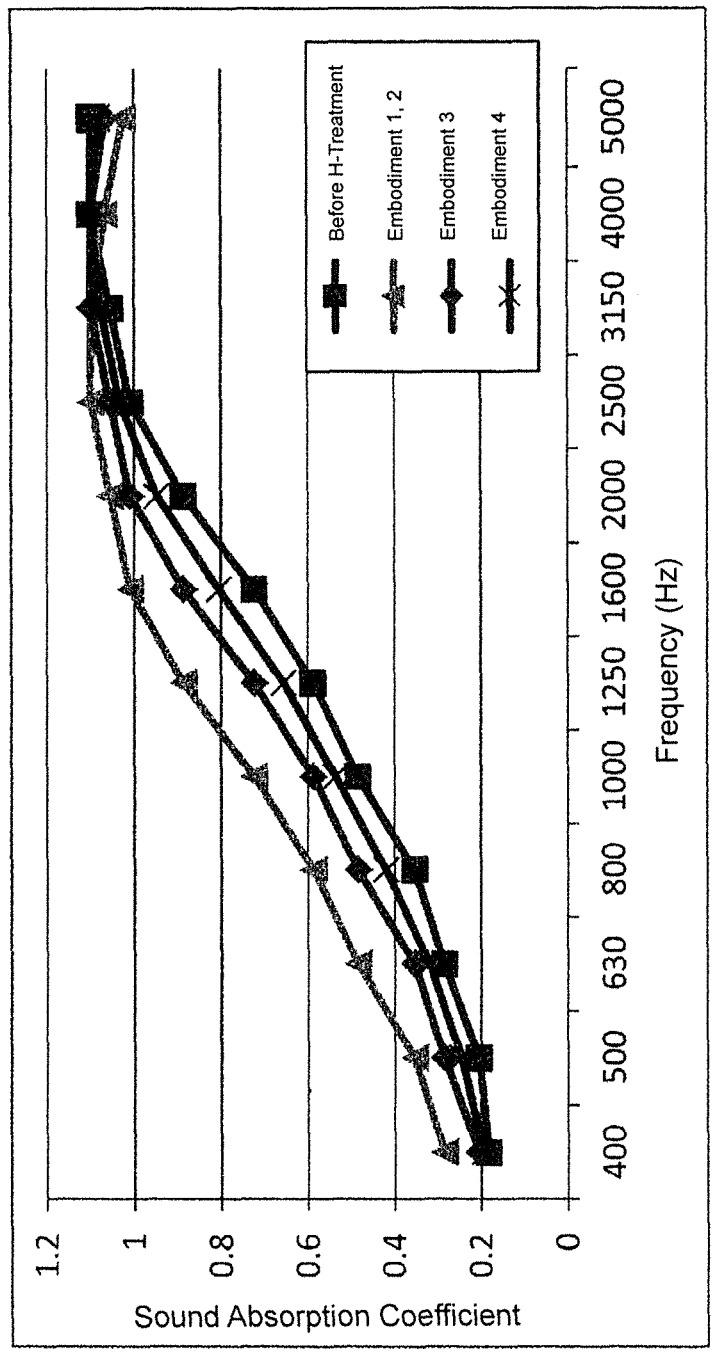
FIG. 6 is a graph showing a relationship of absorption coefficient and frequency in Examples.
Figure 7:
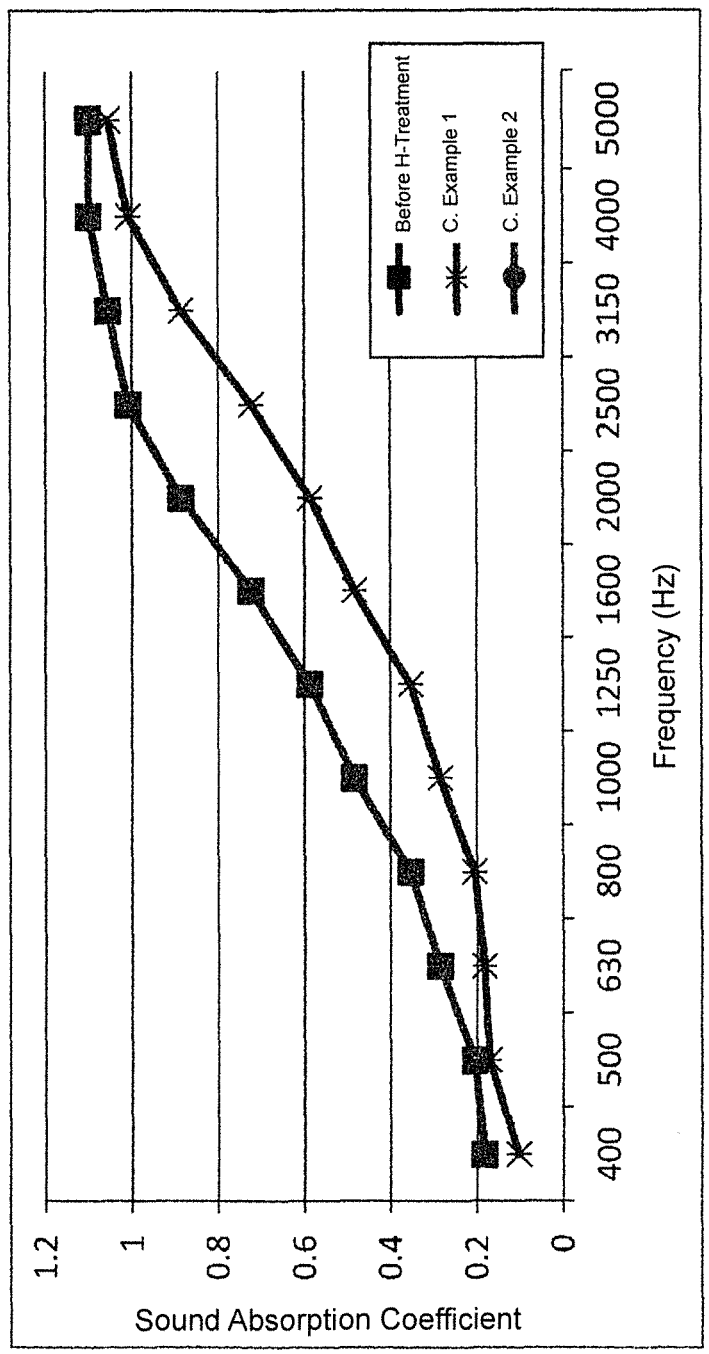
FIG. 7 is a graph showing a relationship of absorption coefficient and frequency in Comparative Examples.

FIG. 6 is a graph showing a relationship of the sound absorption coefficient and the frequency of Examples 1 to 4 and FIG. 7 is a graph showing that of Comparative Examples 1, 2. As shown in FIG. 6, high sound absorption performance was exhibited in a low frequency range of 2000 Hz or lower by an effect of increasing the thickness of the sound absorber in Examples 1 to 4. On the other hand, as shown in FIG. 7, the sound absorption performance in the low frequency range was reduced in Comparative Example 1 and almost no change was seen in Comparative Example 2 as the thickness of the sound absorber was reduced.

[Rubbing Sound Measurement]

In accordance with SAE J2192 "Recommended Testing Methods for Physical Protection of Wiring Harnesses", rubbing sound reducing performance was evaluated for each of the sound absorbers of Examples 1 to 4 and Comparative Examples 1, 3. Dimensions of each of the sound absorbers of Examples and Comparative Examples were 200 mm×50 mm. A measurement condition of a noise meter was 3 seconds in LAmax and a calculated overall value (O.A. value) was compared in the form of a numerical value. Further, a sound insulation box was installed so as not to pick up noise and a measurement was conducted in the sound insulation box.

Figure 8A:
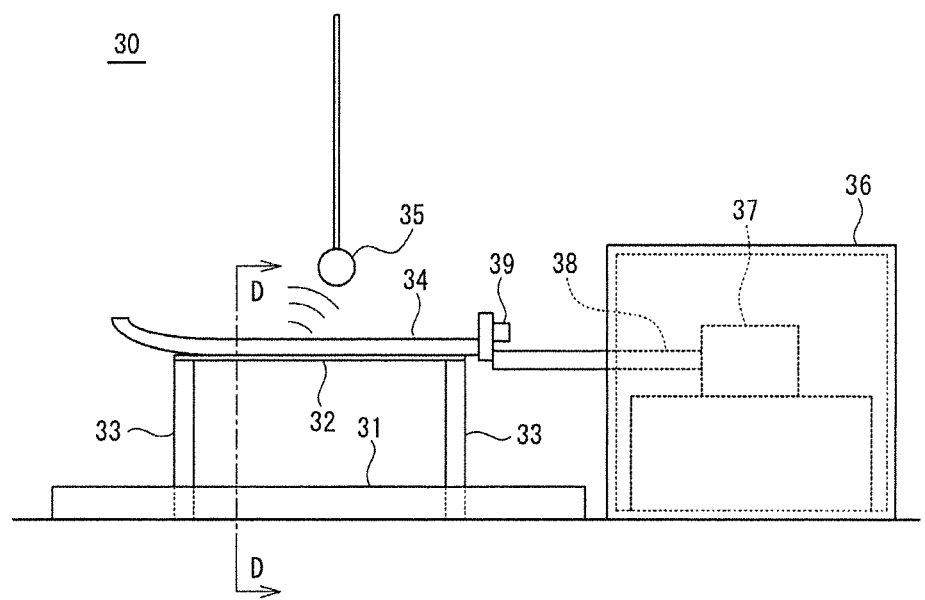
FIG. 8 are diagrams showing a method for measuring rubbing sound of the sound absorber.
Figure 8B:
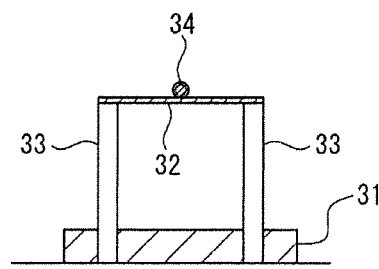

FIG. 8(*a*) is a diagram showing a specific method for measuring rubbing sound and FIG. 8(*b*) is a section along D-D of FIG. 8(*a*). That measurement method is described in detail below.

A sound absorber 31 (sound absorber different from the sound absorber in the present invention) is stuck to an inner wall of a sound insulation box 30 and an iron plate 32 having a thickness of 1.6 mm and an area of 300 mm×500 mm is arranged on a floor part in the sound insulation box 30 while having four corners thereof supported by leg portions 33. A test piece 34 formed by integrating the sound absorber of Examples 1 to 4 and Comparative Examples 1, 3 and a wiring harness and having a diameter ϕ of 15 mm is placed on the upper surface of the iron plate 32 to extend along a longitudinal direction of the iron plate 32 in a center with respect to a lateral direction. A microphone 35 for collecting rubbing sound is arranged at a position spaced upwardly from the iron plate 32 by 150 mm. A tool 38 extending from an exciter 37 abated with a soundproof material 36 is coupled to one end part of the test piece 34 and an acceleration sensor 39 is attached to this end part.

Under such an environment, the test piece 34 was excited at both amplitudes of 5 mm and 9 Hz in an axial direction by the exciter 37. Dark noise was measured at 26 dB and the rubbing sound generated by the test piece 34 was determined be good "○" if it was lower than 38 dB, which was rubbing sound generated by a urethane sheet protective member of "Eptsealer" No. 685 produced by Nitto Denko Cooperation while being determined to be bad "×" if it was not lower than 38 dB. That result is shown in Table 3.

TABLE 3

| | Unit | Ex. 1 | Ex. 2 | Ex. 3 | Ex. 4 | C-Ex. 1 | C-Ex. 3 |
|---|---|---|---|---|---|---|---|
| PET fibers | mass % | 95 | 80 | 60 | 50 | 40 | 0 |
| Low-melting point PET Fibers | mass % | 5 | 20 | 40 | 50 | 60 | 100 |
| Thickness after heating treatment | mm | 14 | 14 | 13 | 12 | 8 | 2 |
| Rubbing sound O. A. Value | mm | 26 | 26 | 27 | 27 | 39 | 45 |
| Reduction amount determination | ○/× | ○ | ○ | ○ | ○ | × | × |

As shown in Table 3, rubbing sound was hardly generated due to the effect of increasing the thickness and very high rubbing sound reducing performance was exhibited for the sound absorbers whose mixing ratios of the low-melting-point PET fibers were 5 to 50 mass % (Examples 1 to 4). On the other hand, in Comparative Examples 1, 3, the thickness after the heating treatment was reduced and no improvement of the rubbing sound reducing performance was confirmed since the mixing ratio of the low-melting-point PET fibers was larger than 50 mass %.

Although Examples and Comparative Examples of the present invention have been described in detail above, the present invention is not limited to the above Examples at all and various changes can be made without departing from the gist of the present invention.

The invention claimed is:

1. A wiring harness for disposition in a clearance having a known cross-sectional dimension and disposed at a location in a vehicle that has an operating temperature at least equal to a specified temperature, the wiring harness comprising:
   at least one wire; and
   a nonwoven fabric surrounding at least a part of the at least one wire at the clearance, the nonwoven fabric having an initial thickness selected so that a cross-sectional dimension of the nonwoven fabric surrounding the at least one wire is less than the known cross-sectional dimension of the clearance, the nonwoven fabric containing first fibers and second fibers, a mixing ratio of the second fibers in the nonwoven fabric is 5 to 50 mass %, all components constituting the second fibers having melting points that are lower than melting points of the first fibers and lower than the specified temperature, and the second fibers being formed from a material that causes a thickness of the nonwoven fabric to increase sufficiently upon melting of the second fibers to cause the nonwoven fabric to fill the clearance.

2. The wiring harness of claim 1, wherein the thickness of the nonwoven fabric increases by 10% or more by the melting of the second fibers.

3. The wiring harness of claim 2, wherein the nonwoven fabric has a basis weight of 50 to 400 g/m² and a thickness of 5 to 20 mm.

4. The wiring harness of claim 3, wherein the melting point of the second fibers is 120° C. or lower.

5. The wiring harness of claim 4, wherein the melting point of the second fibers is 80° C. or lower.

6. The wiring harness of claim 5, wherein a fiber diameter of the second fibers is 4 to 100 μm.

7. The wiring harness of claim 1, wherein the first and second fibers are formed of the same kind of thermoplastic resins.

8. The wiring harness of claim 1, wherein the nonwoven fabric and the at least one wire are integrated by sandwiching at least the part of the at least one wire by a plurality of sheets of the nonwoven fabric.

9. The wiring harness of claim 1, wherein the nonwoven fabric has a basis weight of 50 to 400 g/m² and a thickness of 5 to 20 mm.

10. The wiring harness of claim 1, wherein the melting point of the second fibers is 120° C. or lower.

11. The wiring harness of claim 10, wherein the melting point of the second fibers is 80° C. or lower.

12. The wiring harness of claim 1, wherein a fiber diameter of the second fibers is 4 to 100 μm.

* * * * *